Aug. 1, 1950
J. McCLAIN
2,517,397
COTTER PIN
Filed Dec. 31, 1946
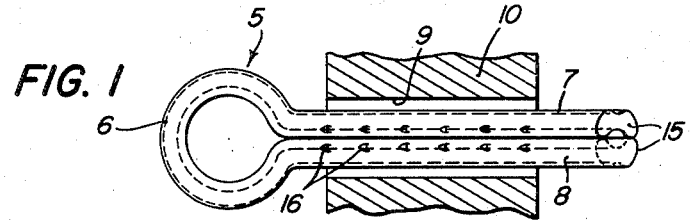
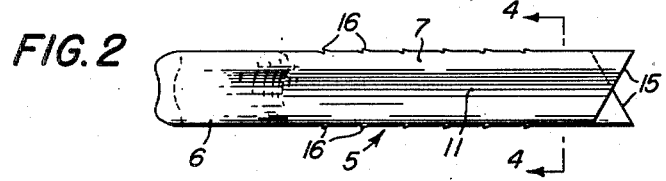
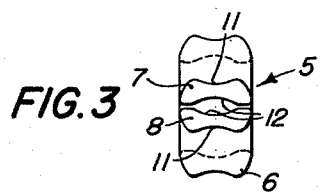
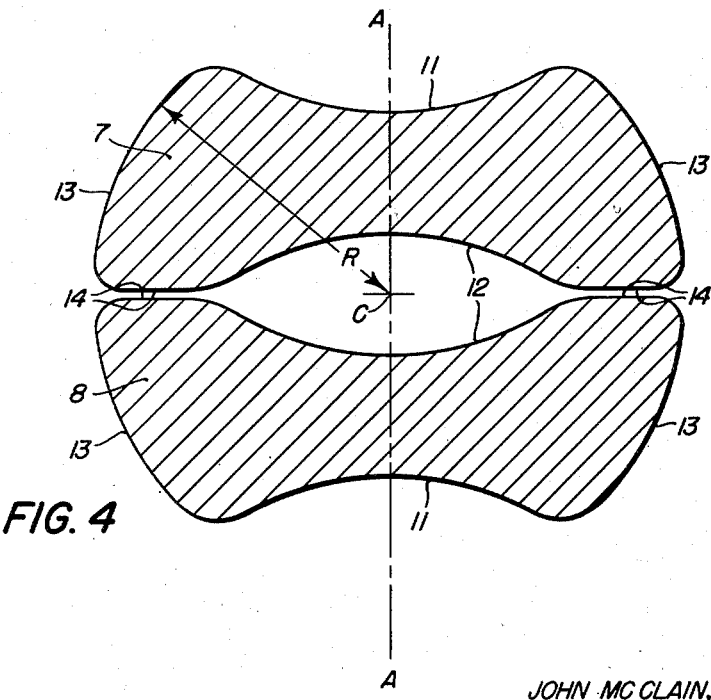
INVENTOR
JOHN McCLAIN, Deceased
NELLIE G. McCLAIN, Executrix
BY C. T. Parker
ATTORNEY Patented Aug. 1, 1950

2,517,397

UNITED STATES PATENT OFFICE 2,517,397

COTTER PIN

John McClain, deceased, late of Chicago, Ill., by Nellie Gretton McClain, executrix, Chicago, Ill.

Application December 31, 1946, Serial No. 719,457

4 Claims. (Cl. 85—8.5)

The present invention relates to cotter pins for securing nuts, bolts, and other parts against accidental displacement due to vibration, jolts, or strains, and has for its principal object the provision of a novel and improved cotter pin which is more dependable than those heretofore known, but light in weight, simple in design and economical to manufacture.

Another object relates to the provision of a cotter pin which can be adapted to fit snugly, even with a drive fit, within an aperture in the part to be secured, thus eliminating any looseness and preventing rattling and chattering of the pin during operation when subjected to vibration. This type of pin is well adapted for use on railway cars, automobiles, and other vehicles in which the parts are constantly being subjected to jolts and vibration.

Although cotter pins of this type are intended to be spread apart after insertion into the aperture to insure that they will not drop out of the aperture, it is still another object of this invention to provide a cotter pin which can be wedged or driven into such a close fit within the aperture that it will not readily work loose under vibration in the event of failure of the operator to spread the pin apart after installation.

Heretofore, cotter pins or other securing pins which have had a drive fit within an aperture have been subject to the disadvantage that if they became rusty after installation, they were very difficult if not impossible to remove from the aperture. It is, therefore, one of the objects to provide a cotter pin which is comparatively easy to remove even when rusted within its aperture. This object is accomplished, according to the present invention, by substantially decreasing the area of contact between the pin and the wall of the aperture and thus to reduce the area of the adhering surfaces.

A still further object relates to the provision of a cotter pin in which means is provided for permitting air or other cooling medium to flow along the pin inside the aperture, thus preventing excess heating of the pin when operating under conditions of high temperatures, thereby reducing the possibility of failure of the pin due to overheating.

These and other objects and advantages of this invention will be apparent to those skilled in the art after a consideration of the following description, reference being made to the drawings appended hereto, in which Figure 1 is a sectional view taken through an apertured part showing a cotter pin embodying the principles of the present invention;

Figure 2 is a plan view of the cotter pin;

Figure 3 is an end view; and

Figure 4 is a sectional view taken along a line 4—4 in Figure 2 and drawn to an enlarged scale.

Referring now to the drawings, the cotter pin 5 comprises a length of generally half round wire bent upon itself to form an enlarged head or loop 6 at one end and a pair of juxtaposed legs 7, 8 adapted to be inserted through a cylindrical aperture 9 in a bolt or other part 10 to be secured by the pin 5.

Each of the legs 7, 8, is provided with a concavity or groove 11 extending longitudinally along the outer side thereof, and a second groove 12 extending longitudinally along the inner side. Except for the outer and inner grooves 11, 12, each leg 7, 8 has a cross section lying within and conforming to a semicircle drawn with a center C substantially on the major axis of the pin 5. Convex outer side portions 13 lying on the arc of the semicircle provide bearing surfaces adapted to contact the inside of the aperture 9, and the two legs have inner side portions 14 which contact each other along opposite edges of the inner grooves 12.

The legs 7, 8, are substantially symmetrical relative to a bisecting axis A—A drawn through the major axis C perpendicular to the plane of the contacting surfaces 14.

Although other proportions may be found suitable, those which have been found preferable are as follows: Each outer groove 11 has a radius of concave curvature approximately equal to the radius R of the semicircle in which the leg lies, drawn from a center located outwardly of the leg on the bisecting axis A—A at a distance from the center C substantially equal to 1.6 times the radius R of the semicircle. Each inner groove 12 has a radius of concave curvature approximately equal to the radius R of the semicircle, drawn from a center located on the bisecting axis at a distance from the center C substantially equal to .8 of the radius R of the semicircle and on the opposite side of the center C.

The cotter pin can be made by rolling a half round wire into the shape described above or drawing it through a die of the proper form, then cutting a length of the wire and bending it into the described shape. Preferably, the ends of the wire are beveled oppositely as indicated at 15 to facilitate spreading by means of a screwdriver or other tool.

The pin can be driven into an aperture 9 of the same radius R as that of the convex surfaces 13, or even slightly undersize, causing the inner surfaces 14 to bear upon each other and the reduced area of cross section of the legs between the inner and outer grooves 12, 11, permits a limited bending or arching of each leg, causing the convex surfaces 13 to be wedged tightly within the aperture 9. This results in the pin 5 resisting movement out of the aperture, regardless of shocks or vibration, but the pin can be even more firmly secured by inserting a tool between the beveled ends 15 and spreading the latter.

To make the pin further resistant against movement out of the aperture, it can be provided with teeth or barbs 16 along the sides 13, inclined toward the head 6.

It will be evident that when the pin is disposed within the aperture 9, the amount of surface area of the pin in contact with the inside of the aperture is appreciably less than in the case of a conventional cotter pin, thus reducing the amount of adhesion in the event that the pin should rust and facilitating driving the pin out of the aperture when removal is desired. Furthermore, the grooves 11, 12 provide ventilating passages through the aperture permitting the flow of air or other cooling medium therethrough. Removal of the pin can be further facilitated by injecting some oil or grease through the grooves to soften the rust and lubricate the pin.

Obviously, a plating of chromium or the like on the pin retards the formation of rust and provides harder bearing surfaces.

It is not desired that this invention be limited to the particular details shown and described herein, except as set forth in the claims which follow.

What it is desired to protect by Letters Patent is:

1. A cotter pin adapted to fit snugly within a cylindrical aperture in a part to be secured and comprising a pair of juxtaposed legs, each leg having a cross section lying within a semicircle and having a longitudinally extending groove along the outer side thereof, said groove having a radius of concave curvature approximately equal to the radius of said semicircle and drawn from a center located outwardly of the leg on the bisecting axis of the semicircle at a distance from the center of the latter substantially equal to 1.6 times the radius of the semicircle.

2. The cotter pin set forth in claim 5 including the further provision that the inner or juxtaposed sides of the legs are provided with longitudinally extending grooves, each of said inner grooves having a radius of concave curvature approximately equal to the radius of said semicircle and drawn from a center located on the bisecting axis of the semicircle at a distance from the center of the latter substantially equal to .8 of the radius of the semicircle.

3. A cotter pin comprising a length of wire bent upon itself to provide a pair of juxtaposed legs having inner sides adapted to contact each other, each of said legs having a generally semi-circular cross section but with longitudinally extending grooves along both inner and outer sides thereof, said outer sides of said legs having convex portions disposed along opposite sides of the outer grooves adapted to drive fit within a cylindrical hole in the part to be secured, the inner grooves being disposed between contacting inner surfaces along the edges of said legs and opposite the outer grooves, thereby reducing the cross sectional area of the legs between the convex portions and providing a limited bending or arching of each leg to cause said convex surfaces to be wedged tightly within the hole.

4. A cotter pin comprising a length of wire bent upon itself to provide a pair of juxtaposed legs having inner sides provided with longitudinally extending grooves facing each other on opposite sides of the major axis and contacting surfaces along their outer edges, the outer sides of said legs having longitudinally extending grooves opposite said grooves on said inner sides, respectively, and convex bearing surfaces along opposite sides of said outer grooves adapted to fit within a cylindrical hole, said opposed grooves in the outer and inner sides serving to reduce the area of cross section of the legs, thereby providing a limited bending or arching of each leg to cause said convex surfaces to be wedged tightly within the hole.

NELLIE GRETTON McCLAIN,
*Executrix of the Estate of John McClain, Deceased.*

REFERENCES CITED

The following references are of record in the file of this patent:

UNITED STATES PATENTS

| Number | Name | Date |
| --- | --- | --- |
| 500,162 | Smith | June 27, 1893 |
| 1,160,807 | Wymer | Nov. 16, 1915 |
| 1,548,688 | Johnson | Aug. 4, 1925 |
| 2,089,578 | Schaefer | Aug. 10, 1937 |

FOREIGN PATENTS

| Number | Country | Date |
| --- | --- | --- |
| 534,678 | Germany | Sept. 30, 1931 |